J. G. FORD.
COTTON SEED DELINTER.
APPLICATION FILED MAR. 17, 1916.
1,261,728.
Patented Apr. 2, 1918.
2 SHEETS—SHEET 2.
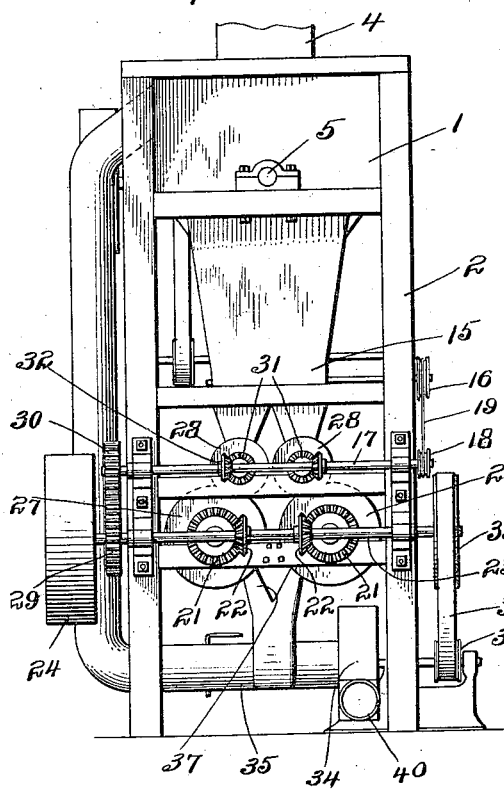
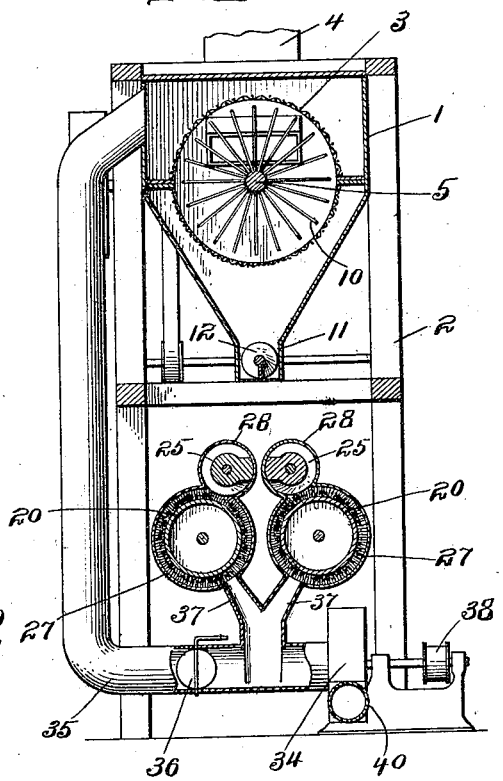
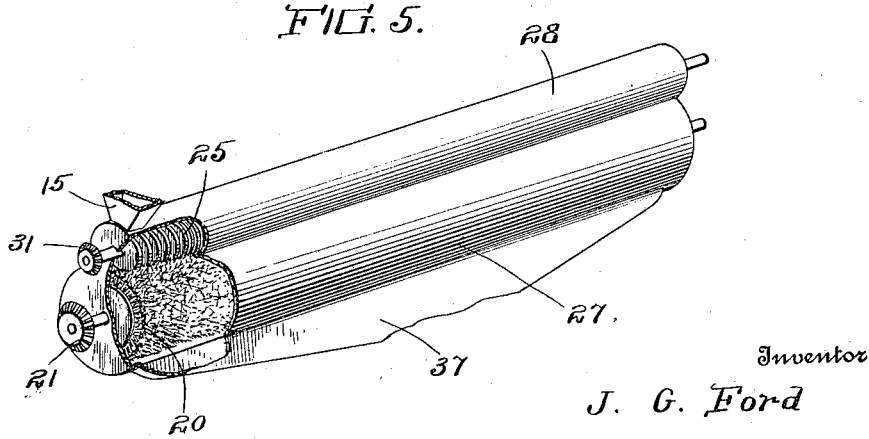
Witnesses
A. C. Newkirk
I. C. Wilcox
Inventor
J. G. Ford
By Victor J. Evans
Attorney

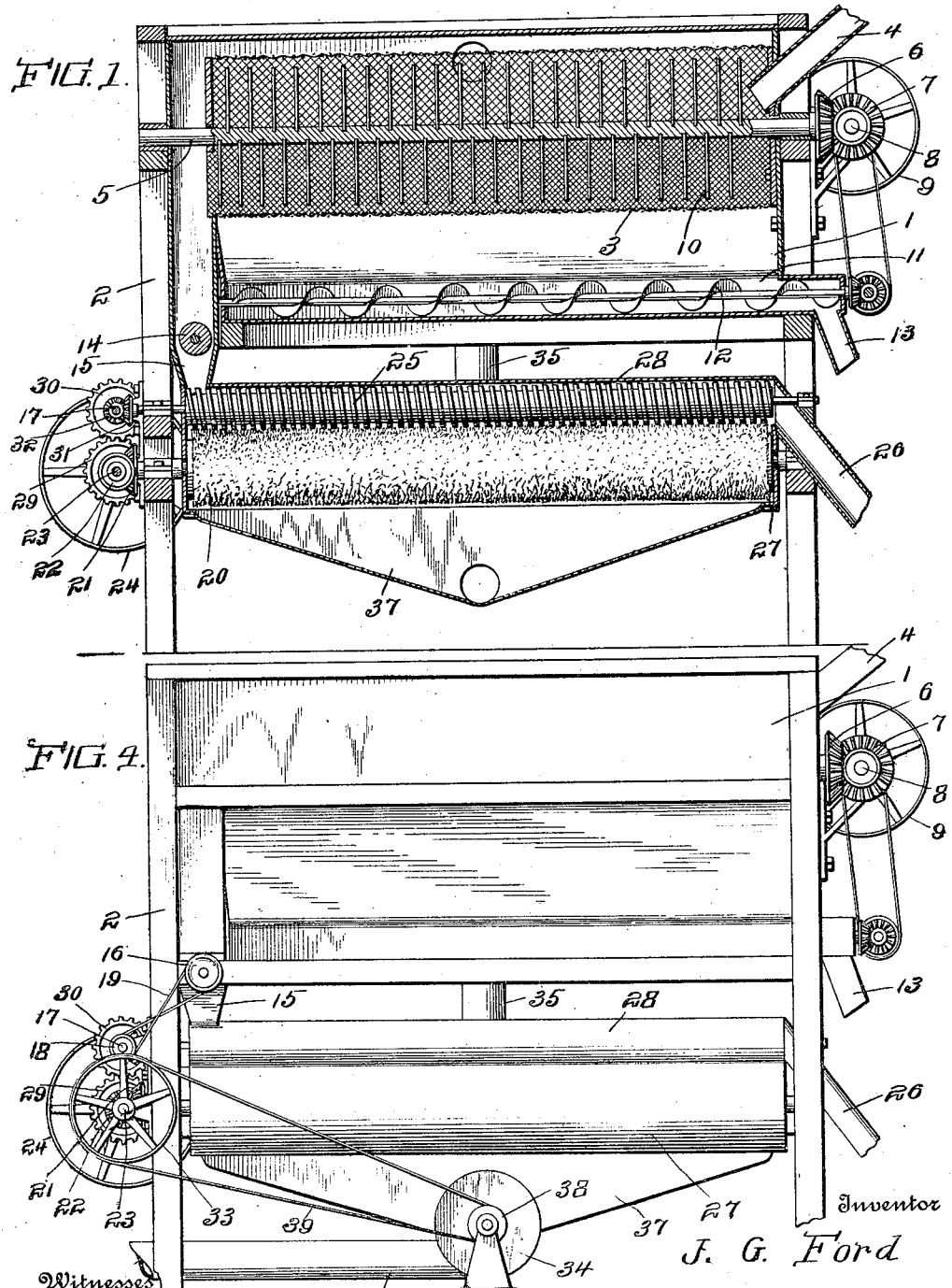

UNITED STATES PATENT OFFICE.

JOE GREENE FORD, OF COVINGTON, GEORGIA.

COTTON-SEED DELINTER.

1,261,728.  Specification of Letters Patent.  Patented Apr. 2, 1918.

Application filed March 17, 1916. Serial No. 84,905.

*To all whom it may concern:*

Be it known that I, JOE G. FORD, a citizen of the United States, residing at Covington, in the county of Newton and State of Georgia, have invented new and useful Improvements in Cotton-Seed Delinters, of which the following is a specification.

This invention relates to cotton seed delinters and it consists in the novel features hereinafter described and claimed.

An object of the invention is to provide a machine of simple and durable structure especially adapted to be used for removing the lint from cotton seed after the same has been ginned in order to prepare the seed for manufacturing or feed purposes or to prepare the seed for transportation or storage in a condition to prevent the possibility of spontaneous combustion occurring incident to the presence of the lint upon the seed.

With the above object in view the delinter includes a casing supported upon a suitable frame having in its upper portion a cylinder composed of open mesh wire cloth. The openings through the upper portion of the said cylinder are of greater diameter than the openings through the lower portion and beater arms are located in the said cylinder and mounted for rotation about an axis. A trough is located below the cylinder and a worm conveyer is operatively mounted in the lower portion of the said trough. A chute is located below the delivery end of the cylinder and a feeder is journaled for rotation in the said chute. A cylindrical brush is journaled for rotation below the said chute and a worm conveyer is journaled above the brush and is adapted to move the seed longitudinally of the brush while the brush is rotating. Suitable means are provided for operating the rotating parts of the delinter.

In the accompanying drawings:—

Figure 1 is a longitudinal sectional view of the delinter.

Fig. 2 is an end view of the same.

Fig. 3 is a transverse sectional view of the same.

Fig. 4 is a side view of the same;

Fig. 5 is a fragmentary perspective view of cylinders used in the delinter.

The delinter comprises a casing 1 which is mounted upon a suitable frame 2. A cylinder 3 is located in the upper portion of the casing 1 and the said cylinder is formed from open mesh wire cloth. The openings through the upper portion of the cylinder 3 are larger than the openings through the lower portion thereof. A feeding chute 4 has its delivery end located in one end of the cylinder 3. A shaft 5 is concentrically positioned in the cylinder 3 and is journaled for rotation upon the frame 2. Any suitable means may be provided for rotating the shaft 5. That shown consists of a gear wheel 6 fixed to the end of the shaft and which meshes with a gear wheel 7 mounted upon a stub shaft 8 and a dove pulley 9 mounted upon the said stub shaft. Beater arms 10 are mounted upon the shaft 5 and are located within the cylinder 3.

A trough 11 is located in the casing 1 below the cylinder 3 and a worm conveyer 12 is journaled for rotation in the bottom of the trough 11. If desired a plurality of troughs 11 with the worm conveyers 12 may be provided. Any suitable means may be provided for rotating the shaft 12. A chute 13 is located upon the frame 2 at the delivery end of the trough 11.

A feeder 14 is journaled for rotation in a chute 15 which extends in a downward direction from the delivery end of the cylinder 3. A belt pulley 16 is mounted upon the shaft of the feeder 14 and a shaft 17 is journaled upon the frame 2. A belt pulley 18 is mounted upon the shaft 17 and a belt 19 is trained around the pulleys 16 and 18 and is adapted to transmit rotary movement from the shaft 17 to the feeder 14.

Brushes 20 are journaled for rotation in the lower portion of the frame 2 and beveled gear wheels 21 are fixed to the shafts of the said brushes. The said wheels 21 mesh with gear wheels 22 which are mounted upon a shaft 23 journaled at the end of the frame 2. A belt pulley 24 is mounted upon the shaft 23 and a belt (not shown) may be trained around the said pulley for the purpose of rotating the said shaft. It is apparent that when the shaft 23 is rotated the intermeshing gear wheels 22 and 21 will rotate the brushes 20. The bristles of the said brushes are preferably formed of wire similar to that used in carding cloth.

Worm conveyers 25 are located above the brushes 20 and the lower portions of the said conveyers are in contact with the bristles of the said brushes. The forward ends of the worm conveyers 25 are disposed under the delivery end of the chute 15 and the delivery ends of the conveyers 25 are opposite a delivery chute 26 mounted upon the frame 2. The brushes 20 are located in cylinders 27 and the worm conveyers 25 are located in cylinders 28. The cylinders 27 and the cylinders 28 communicate with each other. A gear wheel 29 is mounted upon the shaft 23 and meshes with a gear wheel 30 mounted upon the shaft 17. Beveled gear wheels 31 are mounted upon the shafts of the worm conveyers 25 and mesh with beveled gear wheels 32 mounted upon the shaft 17. A belt pulley 33 is mounted upon the shaft 23. A fan 34 is located below the casing 1 and a flue 35 connects the fan casing 34 with the upper portion of the casing 1. The flue 35 is provided with a suitable valve 36. Flues 37 connect at one end with the cylinders 27 and the said flues merge with each other and join with the flue 35 at a point between the fan casing 34 and the valve 36. A pulley 38 is mounted upon the shaft of the fan 34 and a belt 39 is trained around the pulleys 33 and 38.

It is apparent that when the shaft 23 is rotated rotary movement is transmitted by the belt 39 to the rotor of the fan 34 whereby suction draft is created through the flues 35 and 37. Thus the air is drawn from the upper portion of the casing 1 through the flue 35 and the air is drawn from the cylinders 27 through the flues 37.

At the same time the cotton seed bearing the lint is permitted to gravitate through the chute 4 into the cylinder 3. Inasmuch as the arms 10 are rotating about the axis of the shaft 5 the said arms encounter the seed and the same is moved along the open mesh wire which constitutes the cylinder 3. Inasmuch as suction draft is created in the upper portion of the casing 1 any loose lint which passes through the openings of the cylinder 3 is carried by the said suction draft through the flue 35 to the fan casing 34 and is expelled therefrom through the outlet pipe 40. Any particles of hulls or broken seed which pass through the openings in the cylinder 3 fall into the trough 11 and are moved by the conveyer 12 to the chute 13 through which the said particles may gravitate to the floor or ground.

The seed which falls from the delivery end of the cylinder 3 passes down through the chute 15 and is operated upon by the feeder 14 to cause the same to be forced in a downward direction and toward the peripheries of the worm conveyers 25. The worm conveyers 25 move the seed longitudinally of the brushes 20 while the said brushes are rotating and consequently the bristles of the brushes encounter any lint which may be adhering to the peripheries of the seed and the said bristles remove the lint from the seed. The brushes 20 fit sufficiently snug in the cylinders 27 to prevent the seed from passing between the ends of the bristles of the brushes and the inner surfaces of the cylinders. Inasmuch as suction draft is created through the cylinders 27 and flues 37 under the influence of the fan 34 the lint thus removed from the seed by the bristles of the brushes 20 is removed by the suction draft from the said bristles and conveyed through the flues 37 and flue 36 to the fan casing 34 and is expelled from the same through the pipe 40.

The delinted seed is deposited by the worm conveyers 25 into the chute 26 and may pass through the said chute into a suitable receptacle or conveyer.

From the foregoing description taken in conjunction with the accompanying drawing, it will be seen that a delinter of simple and durable structure is provided and that the same will efficiently and thoroughly remove the lint from cotton seed preparatory to shipment, storage or for the manufacture of the same.

Having described the invention what is claimed is:—

A delinter comprising a foraminous cylinder, beaters located therein, a pair of horizontal parallel cylinders communicating with each other at their adjacent sides, the lower cylinder having an outlet located at its lower side and extending throughout the length of the said cylinder, the upper cylinder having an inlet located at one end of its top side and through which it may receive material from the foraminous cylinder, a brush journaled in the lower cylinder, and a worm journaled in the upper cylinder and having one end disposed under said inlet.

In testimony whereof I affix my signature in presence of two witnesses.

JOE GREENE FORD.

Witnesses:
 JNO. B. DAVIS,
 JAMES H. CARROLL.

Copies of this patent may be obtained for five cents each, by addressing the "Commissioner of Patents, Washington, D. C."